US006644988B2

United States Patent
Healy

(10) Patent No.: US 6,644,988 B2
(45) Date of Patent: Nov. 11, 2003

(54) FABRICATED BASEPLATE FOR ELECTRICAL INSTALLATIONS

(76) Inventor: Rafael Healy, Apartado Postal 22/189, Mexico D.F. 14030 (MX)

( * ) Notice: Subject to any disclaimer, the term of this patent is extended or adjusted under 35 U.S.C. 154(b) by 0 days.

(21) Appl. No.: 10/077,908

(22) Filed: Feb. 20, 2002

(65) Prior Publication Data
US 2003/0157819 A1 Aug. 21, 2003

(51) Int. Cl.[7] .............................................. H01R 25/00
(52) U.S. Cl. ...................................... 439/120; 439/209
(58) Field of Search ................................ 439/110, 120, 439/94, 209; D13/139.2, 146; 174/70 C, 97, 48, 49; 52/287.1, 288.1, 716.6, 716.1, 718.01, 718.03

(56) References Cited

U.S. PATENT DOCUMENTS

| | | | |
|---|---|---|---|
| 2,283,398 A | | 5/1942 | Van Deventer |
| 2,441,461 A | | 5/1948 | Wayne |
| 2,464,964 A | | 3/1949 | Charap |
| 3,012,217 A | * | 12/1961 | Pantin ........................ 439/120 |
| 3,786,171 A | | 1/1974 | Shira |
| 4,150,517 A | * | 4/1979 | Warner, Sr. ................. 52/288.1 |
| 4,243,284 A | | 1/1981 | Humphreys |
| 5,052,937 A | | 10/1991 | Glen |
| 5,131,860 A | | 7/1992 | Bogiel |
| 5,203,711 A | | 4/1993 | Bogiel |
| 5,306,165 A | | 4/1994 | Nadeau |
| 5,336,097 A | | 8/1994 | Williamson, Jr. |
| 5,359,817 A | * | 11/1994 | Fulton ........................ 52/288.1 |
| D355,161 S | | 2/1995 | Bodnar |
| 5,688,132 A | * | 11/1997 | Rogers et al. ............... 439/120 |
| RE35,971 E | * | 11/1998 | Kessler ..................... 52/718.01 |
| RE36,030 E | | 1/1999 | Nadeau |
| 6,189,276 B1 | * | 2/2001 | Pinto et al. ................. 52/288.1 |
| 6,216,406 B1 | * | 4/2001 | Hauser ....................... 52/716.1 |

FOREIGN PATENT DOCUMENTS

| | | | |
|---|---|---|---|
| EP | 0 428 055 A2 | 5/1991 | |
| GB | 517318 | 1/1940 | |
| GB | 2 067 363 A | 7/1981 | |
| GB | 2 149 230 A | 6/1985 | |
| GB | 2236777 A | * 4/1991 | ............... 52/718.01 |

* cited by examiner

Primary Examiner—Renee Luebke
Assistant Examiner—Felix O. Figueroa
(74) Attorney, Agent, or Firm—Richard C. Litman

(57) ABSTRACT

A fabricated baseplate for electrical installations including a continuous insulative plastic device placed adjacent a floor of any room for insertion of any inlet plug of an appliance at any position in a room. The device has three parallel frontal indentations with each indentation containing a continuous necked electrical contact strip installed during the extrusion of the device. A support bracket is installed along a wall proximate the floor for positioning and securing the device which has cooperating protuberances in a top rear cavity. The device also has a bottom trough for installation of any electrical cables.

9 Claims, 2 Drawing Sheets

FABRICATED BASEPLATE FOR ELECTRICAL INSTALLATIONS

BACKGROUND OF THE INVENTION

1. Field of the Invention

The present invention relates generally to electrical outlets. More specifically, the invention is a continuous wall bracket supported electrical outlet installed proximate the floor and around a room.

2. Description of the Related Art

The related art of interest describes various electrical outlets, but none discloses the structure of the present invention. There is a need for a continuous and safe electrical floor outlet which can be installed in new or old buildings. The following patents are considered related art.

U.S. Pat. No. 2,464,964 issued on Mar. 22, 1949, to Norman N. Charap describes a selective station outlet molding running along the wall length adjacent to the baseboard comprising an extruded plastic core covered by a U-shaped plastic hood having internal and external longitudinal grooves of weakness. The core is E-shaped in cross-section containing a pair of brass or copper bus bars with turned in flanges which slide into undercut beads. The hood becomes part of the baseboard. The installer on the job makes openings in the internal and external longitudinal grooves according to his "selective powers". The corners are negotiated by the bus bars by adding an L-shaped connection. The system is distinguishable for requiring the electrician to open the preferred locations in the outlet molding for enabling an electrical plug with two contacts to contact the bus bars.

U.S. Pat. No. 4,243,284 issued on Jan. 6, 1981, to Michael Humphreys describes an electrical distribution system with a hollow conduit having a continuous slot for the wall plug which must be rotated to bring its contact pins into contact with the conductors.

U.S. Reissue Pat. No. Re. 36,030 issued on Jan. 5, 1999, and U.S. Pat. No. 5,306,165 issued on Apr. 26, 1994, to Jacques Nadeau describes an electrical distributing system with wall mounted tracks containing electrical outlets and communication lines. The tracks are slidingly received in connecting slots of electrical connector housings to connect the tracks to electrical outlets, or to interconnect sections of tracks together.

U.S. Reissue Pat. No. 355,161 issued on Feb. 7, 1995, to Larry J. Bodnar describes a combined electrical outlet and outlet holder comprising an outlet with a pair of prong contacts, a longitudinal holder with two longitudinal apertures, and a U-shaped wall bracket to secure the holder.

U.S. Pat. No. 2,283,398 issued on May 19, 1942, to Harry R. Van Derventer describes an electric circuit molding made of rubber which may be tapped at any point comprising two longitudinal slots which are normally closed but have deformable edges for tapping. A channeled metal support holds the electric molding and covers the pre-existing floor molding. Phosphorbronze conductor strips with in-turned edges are inserted in each of the two slots in the rubber circuit molding.

U.S. Pat. No. 2,441,461 issued on May 11, 1948, to Anthony Wayne describes an electric utility connection moulding comprising a U-shaped plastic moulding having an inner filler strip to define two longitudinal recesses for incorporating a pair of resilient tubular contacts.

U.S. Pat. No. 3,786,171 issued on Jan. 15, 1974, to Jerry P. Shira describes an integral hinged wiring raceway.

U.S. Pat. No. 5,052,937 issued on Oct. 1, 1991, to Bryan D. Glen describes a baseboard with a movable electrical outlet slid along a track.

U.S. Pat. No. 5,131,860 issued on Jul. 21, 1992, and U.S. Pat. No. 5,203,711 issued on Apr. 20, 1993, to Steven B. Bogiel describes a modular interchangeable power distribution system for electrification of modular wall panels.

U.S. Pat. No. 5,336,097 issued on Aug. 9, 1994, to Lawrence J. Williamson, Jr. et al. describes a modular electrical power distribution system comprising with an elongate track and a plurality of power tap assemblies that are engageable with the track.

U.K. Patent Application No. 517,318 published on Jan. 26, 1940, for Drury N. Davies et al. describes a plastic hollow duct having two or more spaced conductor members, and has a slot or openings between them into which a plug can be inserted along with an earth contact.

U.K. Patent Application No. 2 067 363 A published on Jul. 22, 1981, for Akihiro Suzue et al. describes an electric power supply track with upper and central buffer spaces for encasing a pair of conductors for an electric power supply for a plug-in socket and for wiring cables.

U.K. Patent Application No. 2 149 230 A published on Jun. 5, 1985, for John I. Hankin describes an electrical track distribution system comprising an elongate box panel with a longitudinal aperture defining lips of differing thickness, and with electrical conductors on the inwardly facing lip surface. An earth conductor is located on back inner surface of the panel.

E.P.O. Patent Application No. 0 428 055 A2 published on May 22, 1991, for Eero Pajunen describes a conductor rail having various cross-sectional configurations ranging from a U-shaped rail to circular with or without a cover. A plurality of conductors are inset in longitudinal insulator grooves. Various configurations of insulator structures are described.

None of the above inventions and patents, taken either singularly or in combination, is seen to describe the instant invention as claimed. Thus, a fabricated continuous baseplate for electrical installations solving the aforementioned problems is desired.

SUMMARY OF THE INVENTION

The present invention is directed to a continuous baseboard electrical outlet which can be installed during initial construction, or after as a retrofit. There is a need for this device for providing the placement of electrical appliances at any point in a room without being restricted to actual spaced outlets and an inadequate number to support the appliances required for a specific room, be it a bedroom, kitchen, living room, hallway, etc. The universal outlet is safe from curious children, but allows placement of an electrical appliance anywhere in a room at any time. The baseboard electrical outlet has a support bracket for the wall, continuous embedded electrical contacts along the length of the electrical device to allow a user to install an electrical plug into the outlet at any point along the length of the outlet, and a duct for communication cables. This extruded base plate wall outlet device can be substituted for any existing electrical base plate.

Accordingly, it is a principal object of the invention to provide a safe, continuous, electrical plug outlet for any room, hallway and the like.

It is another object of the invention to provide a continuous electrical plug outlet as a baseboard and a substitute for existing electrical base plate outlets.

It is a further object of the invention to provide a continuous electrical baseboard plug outlet which is extruded and has continuous embedded electrical contacts.

Still another object of the invention is to provide a continuous electrical baseboard plug outlet which has a duct for communication cables such as telephone and cable television wires.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
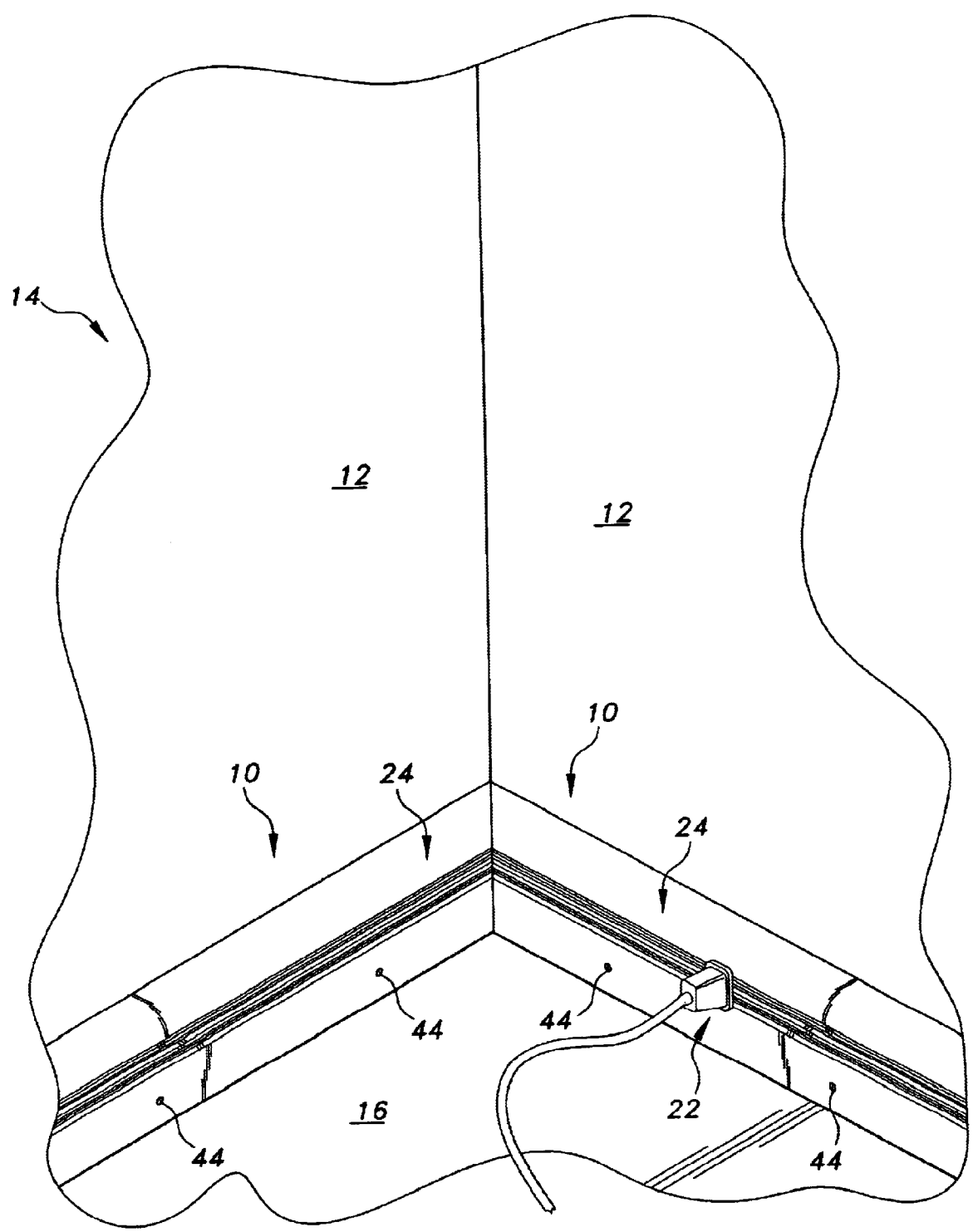
FIG. 1 is a partial, environmental, perspective view of a room corner having a continuous fabricated baseplate for electrical installations installed with an exemplary electrical plug for an appliance inserted according to the present invention.
Figure 2:
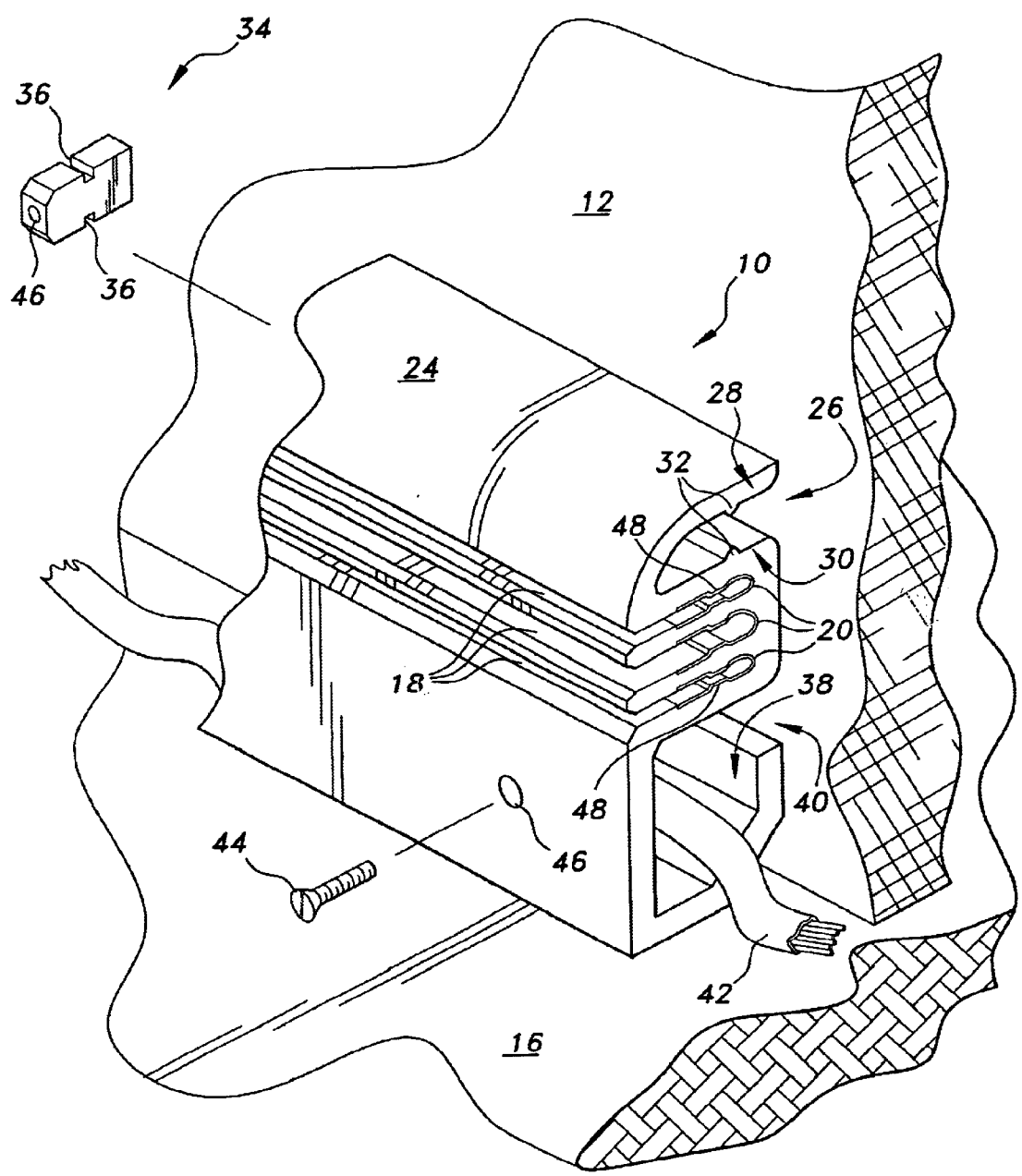
FIG. 2 is a partial exploded perspective view of the outlet with its support bracket, fastener, and an included electrical cable.

The present invention illustrated in FIGS. 1 and 2 is directed to a fabricated electrical baseplate outlet device 10 for electrical installations along the wall 12 of a room 14 adjacent the floor 16.

As shown in FIG. 2, the device 10 comprises an extruded extensive length of an insulative plastic baseplate having three continuous parallel indentations 18 exposed in its front portion along its entire length. Each indentation 18 has a continuous electrical contact strip 20 in its innermost region for insertion of an electrical inlet plug and wire 22 (FIG. 1) of an appliance (not shown) for a source of electricity. The plug portion 22 may have either a ground electrode or not.

As depicted in an enlarged version with an open end in FIG. 2, the device 10 has a continuous coping 24 having a rear open cavity 26 with a top wall 28 and a bottom wall 30. The cavity 26 is continuous, linear, and has a pair of parallel aligned protuberances or keys 32 on its top and bottom walls 28, 30, respectively.

As shown in FIG. 2, a rectangular plastic block 34 has linear aligned slots or keyways 36 conforming to include by friction fit the two protuberances or keys 32 in the cavity 26 for securing the device 10 along the wall 12 on the floor 16. The block 34 has an aperture 46 aligned with its horizontal axis for fastening the block 34 to the wall 12.

The device 10 has a continuous trough 38 in its bottom portion with a continuous rear opening 40 for insertion of one or more electrical cables 42. The device 10 is attached to walls 12 adjacent the floor 16 by fasteners 44 inserted through apertures 46 made during the installation in the front portion of the device 10 in the region of the continuous rear opening 40 in the trough 38.

The three continuous electrical contact strips 20 are U-shaped brass strips embedded in the indentations 18 during extrusion of the device 10. This construction adds to the stability of the contact strips 20 in the device 10 to withstand the frequent insertion and withdrawal of the inlet contact plugs 22 over a prolonged period of use. The U-shaped brass strips 20 have a pair of aligned, parallel, narrow, and longitudinal protrusions 48 for securely gripping the electrodes of each plug 22 inserted in the device 10.

Thus, an economical and ergonomic electrical baseplate device 10 has been shown which would eliminate the problem of placing electrical appliances at restricted specific baseboard outlets in a room, hallway and the like, when building or installing as a retrofitting device in a dwelling.

It is to be understood that the present invention is not limited to the embodiment described above, but encompasses any and all embodiments within the scope of the following claims.

I claim:

1. A fabricated baseplate outlet device for electrical installations, comprising:

an extruded insulative baseplate having a length, a front portion, a rear portion, a top portion and a bottom portion, the front portion defining three continuous parallel indentations extending along the length, the rear portion defining an open cavity at the top portion extending along the length of said baseplate;

each of said indentations having a continuous electrical contact for conducting current from a source of electricity; and a generally rectangular block cooperating with the open cavity for securing said baseplate to a wall structure.

2. The baseplate outlet device according to claim 1, wherein the rear portion of said baseplate defines a continuous trough extending along the length at the bottom portion for insertion of electrical cables.

3. The baseplate outlet device according to claim 1, wherein said insulative baseplate and said block are made of plastic.

4. The baseplate outlet device according to claim 1, wherein each said continuous electrical contact includes a U-shaped brass strip embedded in each of said indentations during extrusion of the device.

5. The baseplate outlet device according to claim 4, wherein each said U-shaped brass strip includes a pair of parallel protrusions for gripping electrodes of a plug when inserted in said device.

6. The baseplate outlet device according to claim 1, wherein the open cavity includes top and bottom walls.

7. The baseplate outlet device according to claim 6, wherein said open cavity defines a continuous linear key extending along each of the top and bottom walls.

8. The baseplate outlet device according to claim 7, wherein said rectangular block includes linear slots conforming to each said key in said open cavity.

9. The baseplate outlet device according to claim 8, wherein said block has a horizontally aligned aperture for fastening said block to the wall structure.

* * * * *